US008550336B2

United States Patent
Wang et al.

(10) Patent No.: US 8,550,336 B2
(45) Date of Patent: Oct. 8, 2013

(54) SYSTEMS AND METHODS FOR ANTI-COUNTERFEIT AUTHENTICATION THROUGH COMMUNICATION NETWORKS

(75) Inventors: Lei Wang, San Diego, CA (US); Keli Liu, Changsha (CN); Yuebiao Wang, San Diego, CA (US); JueXin Wang, New York, NY (US); Chen Liu, New York, NY (US); Yunnan Xiao, Changsha (CN)

(73) Assignee: Name Technology, Inc., San Diego, CA (US)

( * ) Notice: Subject to any disclaimer, the term of this patent is extended or adjusted under 35 U.S.C. 154(b) by 14 days.

(21) Appl. No.: 13/416,873

(22) Filed: Mar. 9, 2012

(65) Prior Publication Data
US 2012/0234908 A1 Sep. 20, 2012

Related U.S. Application Data

(60) Provisional application No. 61/454,270, filed on Mar. 18, 2011.

(51) Int. Cl.
*G06K 17/00* (2006.01)
(52) U.S. Cl.
USPC ............................................ 235/375
(58) Field of Classification Search
USPC ............................................ 235/375
See application file for complete search history.

(56) References Cited

U.S. PATENT DOCUMENTS

| 2005/0021781 | A1 | 1/2005 | Sunder et al. |
| 2010/0037297 | A1 | 2/2010 | Grant et al. |
| 2010/0313037 | A1* | 12/2010 | Ward ............................ 713/189 |

FOREIGN PATENT DOCUMENTS

| KR | 10-2005-0108667 A | 11/2005 |
| KR | 10-2007-0052092 A | 5/2007 |

OTHER PUBLICATIONS

International Search Report and Written Opinion mailed on Sep. 12, 2012 in PCT/US2012/028575, 11 pages.

* cited by examiner

*Primary Examiner* — Steven S Paik
*Assistant Examiner* — Christle Marshall
(74) *Attorney, Agent, or Firm* — Procopio, Cory, Hargreaves & Savitch LLP

(57) ABSTRACT

An anti-counterfeit authentication system provides authentication services over available communication networks. The system assigns unique anti-counterfeit certificates to authentic items. The certificates are stored in anti-counterfeit tags that are attached to the authentic items. An authentication server provides authentication services to authentication clients over the communication networks. The authentication clients read, via tag readers, the anti-counterfeit certificates from the tags associated with items to be authenticated, provide the anti-counterfeit certificates to the authentication server which determines authenticity and supplies authentication results back to the authentication clients.

20 Claims, 6 Drawing Sheets

SYSTEMS AND METHODS FOR ANTI-COUNTERFEIT AUTHENTICATION THROUGH COMMUNICATION NETWORKS

CROSS-REFERENCE TO RELATED APPLICATIONS

This application claims the benefit of U.S. Provisional Application No. 61/454,270, filed Mar. 18, 2011, which is hereby incorporated by reference.

BACKGROUND

Counterfeit items, including counterfeit famous brand products and counterfeit fine art items, are a serious problem in many countries in the world. Some counterfeit items are almost indistinguishable from authentic items by human eyes and even by some testing equipment. Such counterfeit products harm both consumers and producers of the authentic items. Counterfeit products also disrupt regular economic operations of many countries.

SUMMARY

The disclosed anti-counterfeit authentication (ACA) systems and methods can provide authentication services anytime and anywhere over available communication networks for any entities that need counterfeit detection. In an embodiment, the anti-counterfeit authentication system assigns unique anti-counterfeit certificates to authentic items. Example authentic items include: famous brand wines and beverages; famous luxury consumer products, e.g., purses, watches, jewelry, clothes, shoes, and luggage; famous consumer electronic devices, such as cell phones; famous brand cigarettes; famous art items; famous brand cosmetic products; medicines; books, software, music and video products; and school graduation certificates, academic degree certificates, award certificates, and professional licenses. The certificates are stored in anti-counterfeit tags (ACTs) that are attached to the authentic items. An authentication server provides authentication services to authentication clients over communication networks. The authentication clients read, via ACT readers, the anti-counterfeit certificates from the ACTs associated with items to be authenticated, provide the anti-counterfeit certificates to the authentication server which determines authenticity and supplies authentication results back to the authentication clients. Authentication of items may also be referred to anti-counterfeit certificate authentication, or counterfeit detection.

In one aspect, the invention provides a communication network based anti-counterfeit authentication system including an anti-counterfeit tag storing an anti-counterfeit certificate, the anti-counterfeit certificate having an encrypted code corresponding to an authentic item; an authentication server configured to receive an authentication request through a communication network, conduct authentication of the authentication request, and provide an indication of the conducted authentication; and an authentication client configured to originate the authentication request, the authentication request including at least some of the contents of the anti-counterfeit tag, the authentication client further configured to transmit the authentication request through the communication network to the authentication server, receive the indication of the conducted authentication from the authentication server through the communication network, and supply the indication of the conducted authentication to a user of the anti-counterfeit authentication system.

In one aspect, the invention provides a method for operating an authentication server in an anti-counterfeit authentication system, the method including receiving an authentication request from an authentication client through a communication network, the authentication request including at least some of the contents of an anti-counterfeit tag, the anti-counterfeit tag storing an anti-counterfeit certificate associated with an authentic item; determining authenticity for the authentication request; and communicating the authenticity determination to the authentication client through the communication network.

In one aspect, the invention provides a method for operating an authentication client in an anti-counterfeit authentication system, the method including establishing connectivity between the authentication client and an authentication server; mutually authenticating the authentication client and the authentication server; establishing a secured channel between the authentication client and the authentication server; receiving an anti-counterfeit certificate read from an anti-counterfeit tag; sending an authentication request to the authentication server, the authentication request including at least some of the of the anti-counterfeit certificate; receiving an authenticity determination from the authentication server, the authenticity being determined using contents of the authentication request; and terminating the connectivity between the authentication client and the authentication server.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
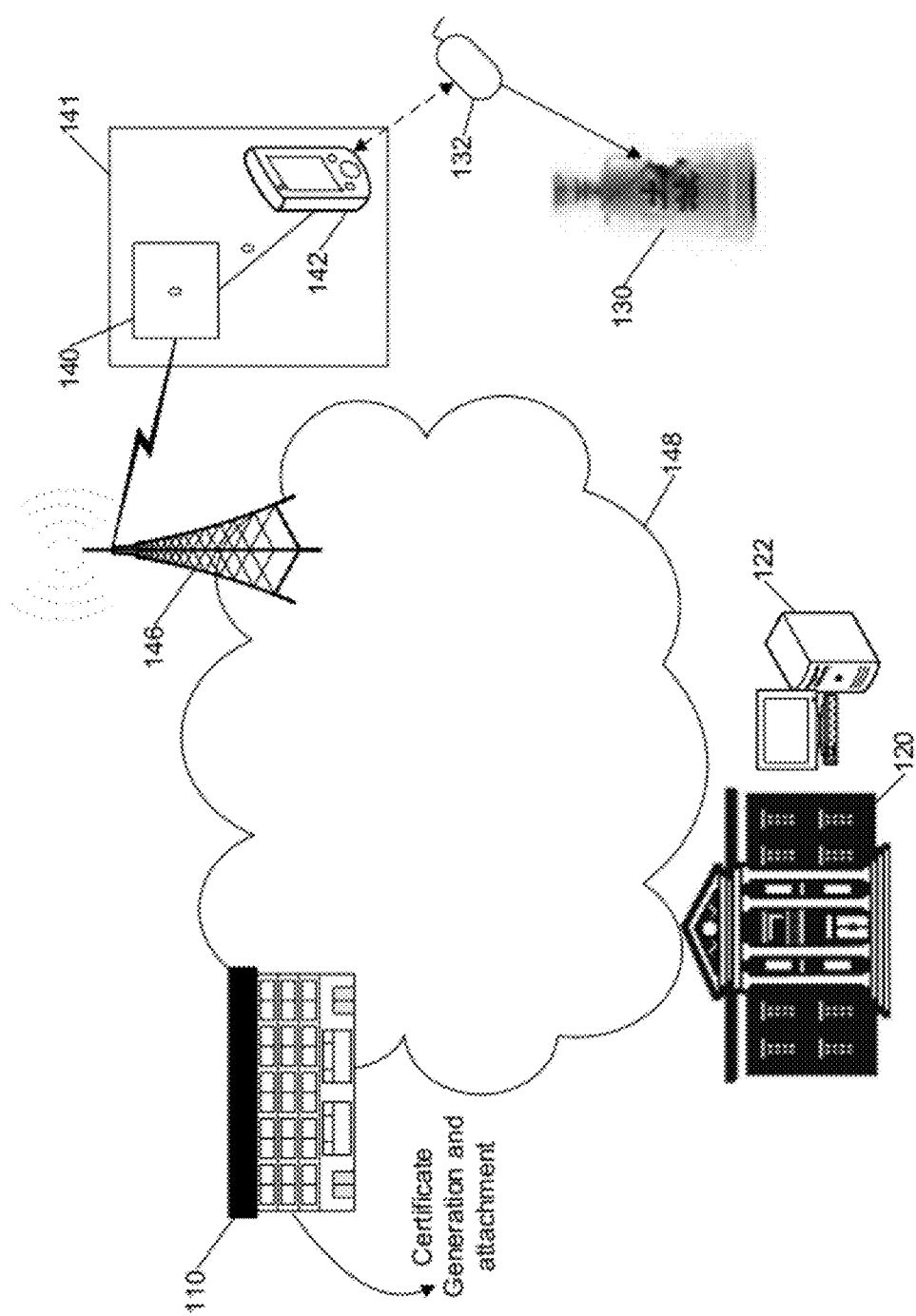
FIG. 1 is a block diagram including elements of an anti-counterfeit authentication system in accordance with aspects of the invention.

FIG. 1 is a block diagram including elements of an anti-counterfeit authentication (ACA) system. The system includes an authentic item producer 110 who produces an authentic item 130. The authentic item 130 is protected by an anti-counterfeit certificate. An anti-counterfeit tag (ACT) 132 contains the anti-counterfeit certificate. The anti-counterfeit certificate is created using an anti-counterfeit certificate generator. The anti-counterfeit tag 132 is attached to or otherwise associated with the authentic item 130.

An authentication client or module 140 originates requests for authentication services and provides an interface between users and the ACA system. An ACT reader 142 is used to read the anti-counterfeit certificate from the ACT 132. An ACT writer may be used to update contents of the ACT. The ACT writer can be combined with the ACT reader 142 or may be a separate device. In one embodiment, the authentication client 140, ACT reader 142, and ACT writer are a single device, for example, a mobile phone 141.

An authentication server 122 provides authentication services to the authentication client 140. The authentication server 122 is located in an authentication center 120. A communication network 148 provides communication between the authentication client 140 and authentication server 122. In the embodiment of FIG. 1, the communication network 148 includes a base station 146 for wireless communications with the authentication client 140.

Although FIG. 1 shows a single instance of the various components, an anti-counterfeit authentication system may have many instances of each component. Additionally, the division of components shown in FIG. 1 is for illustration of functions. Other embodiments may have multiple components combined in one device or may have one component spread over multiple devices. For example, the ACT reader 142 and the authentication client 140 can be provided in the same device, for example, a smart phone.

Anti-Counterfeit Certificate

Figure 2:
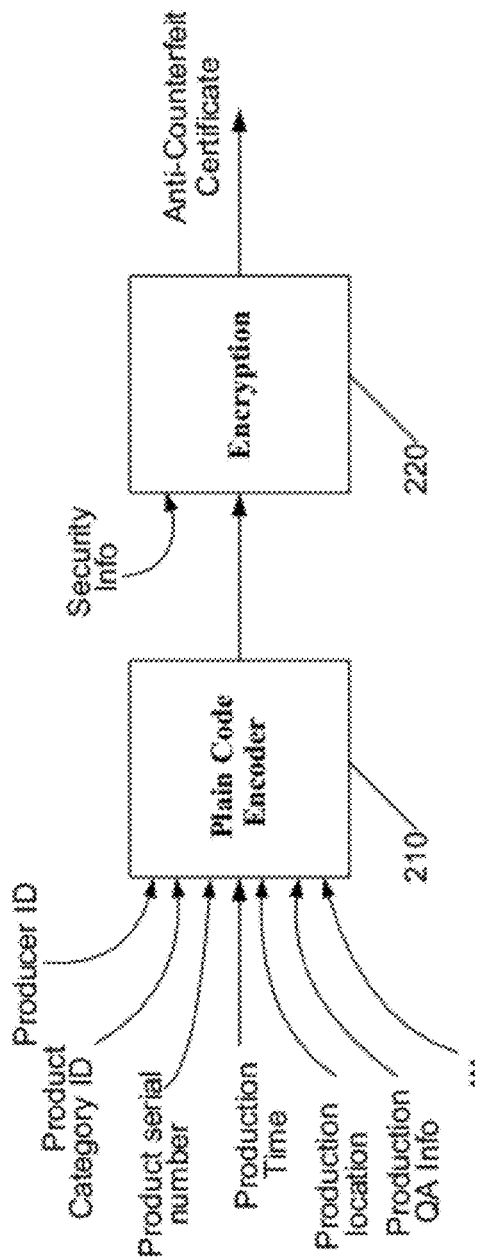
FIG. 2 is a functional block diagram of an anti-counterfeit certificate generator in accordance with aspects of the invention.

FIG. 2 is a functional block diagram of an anti-counterfeit certificate generator. The anti-counterfeit certificate generator may be used to generate the anti-counterfeit certificate of the ACA system shown in FIG. 1. The anti-counterfeit certificate is an encrypted code that can uniquely identify an authentic item for counterfeit detection. For a given authentic item, its anti-counterfeit certificate is generated by the anti-counterfeit certificate generator. The anti-counterfeit certificate generator includes a plain-code encoder module 210 and an encryption module 220.

The anti-counterfeit certificate is generated by encrypting a plain code. The plain code is generated by using descriptor parameters that describe the authentic item. Characteristics of an anti-counterfeit certificate generator may be discussed in terms of descriptor parameter selection, plain code generation, and encryption.

The descriptor parameters can be chosen to uniquely and precisely describe the authentic item. Alternatively, the descriptor parameters can describe a group of authentic items, such as a single production run of the item or carton of authentic items. Example descriptor parameters include producer identification (ID), product category identification, product serial number, production time, production location, and product quality assurance (QA) information. It should be apparent that many other descriptor parameters can be used additionally or alternatively to those shown in FIG. 2.

The plain code encoder module 210 receives values of the selected descriptor parameters and generates a plain code. The plain code can have a predefined length (e.g., number of bits). The predefined length can be chosen so that the generated code for the given authentic item is unique and so that generated certificate can be stored in a chosen ACT. In other embodiments, the length of the plain code may vary.

The plain code can be generated in many ways. In an embodiment, the plain code encoder module 210 concatenates the values of the selected descriptor parameters to form the generated plain code as a single value. In an embodiment, the plain code encoder module 210 randomizes ordering of the concatenated descriptor parameter values and provides parameter location information in a known place in the generated plain code. In an embodiment, the plain code encoder module 210 interleaves the descriptor parameter values. The interleaving pattern may be predefined or information indicating the interleaving pattern may be included in the generated plain code. In an embodiment, the plain code encoder module 210 generates a hash code using the descriptor parameter values. In an embodiment, the plain code encoder module 210 produces the plain code using XML format, which is easily compatible with different versions of plain code. In other embodiments, a combination of generation methods is used.

The encryption module 220 receives the plain code from the plain code encoder module 210 and encrypts the plain code to produce the anti-counterfeit certificate. The encryption module 220 also receives security information, e.g., encryption keys, for use in encrypting the plain code. The security information may be provided by a local security module. Alternatively, the security information may be provided by a security server accessible over the communication network 148, for example, an authentication, authorization, and accounting server. The data encryption algorithm can be designed specifically for an anti-counterfeit authentication application or can be a commonly used encryption algorithm, e.g., a DES (Data Encryption Standard) algorithm, an AES (Advanced Encryption Standard) algorithm, a hash (MD5, RSA-128), or a commutative hash to generate a key.

Figure 3:
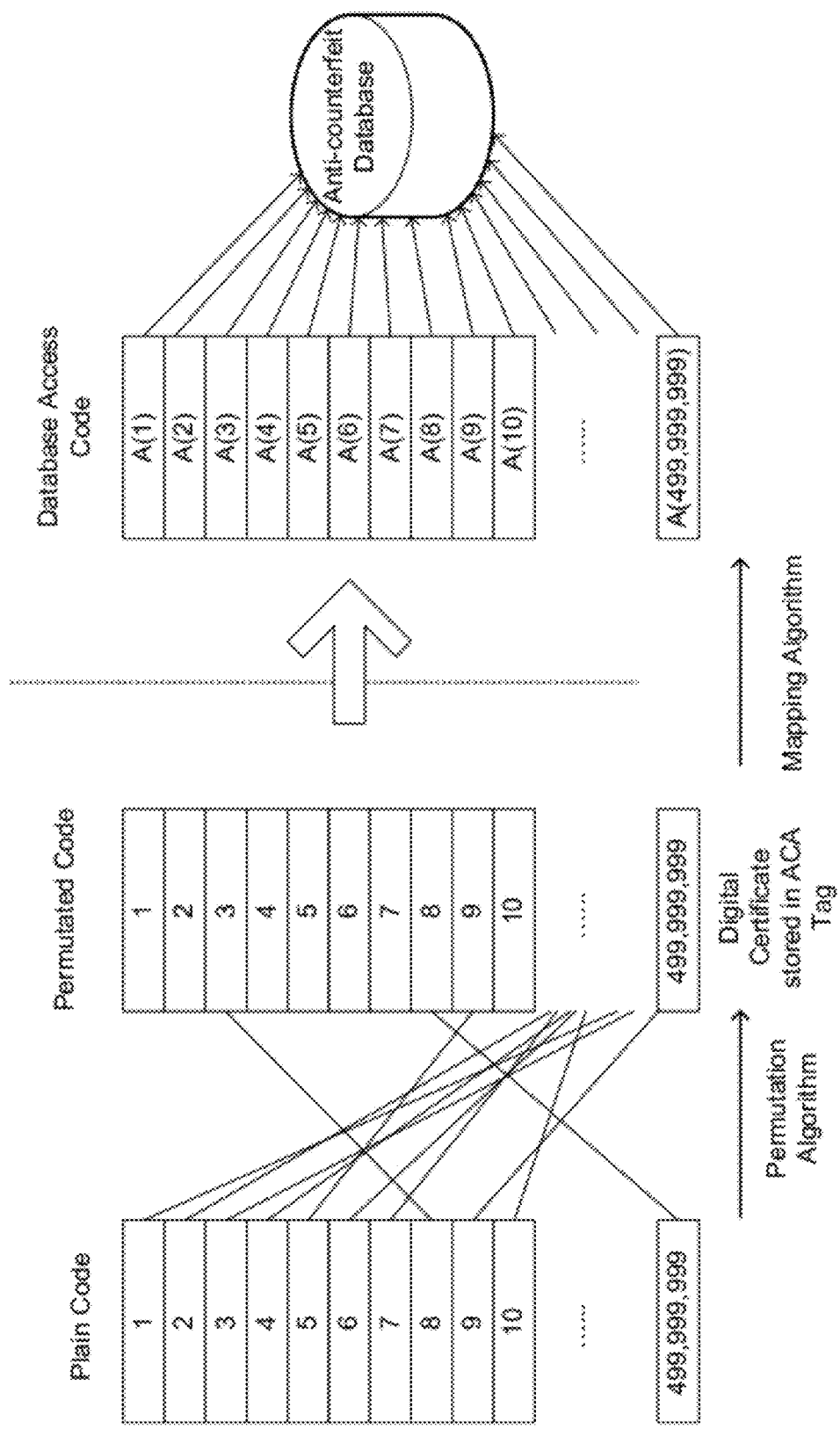
FIG. 3 is a functional block diagram of another anti-counterfeit certificate generator in accordance with aspects of the invention.

FIG. 3 is a functional block diagram of another (code permutation) anti-counterfeit certificate generator. The certificate generator of FIG. 3, which may be used to generate the anti-counterfeit certificate of the ACA system shown in FIG. 1, uses a code permutation digital certificate (CPDC) process. Instead of using encrypted descriptor parameters as described above, CPDC process generates a digital certificate in a given code domain by a predefined code permutation algorithm. In various embodiments, the authenticate item's descriptor parameters may or may not be used by the CPDC generator.

In an example ACA system, digital certificates are in the domain of integers from $N_{min}$ to $N_{max}$, where $N_{min}<N_{max}$. For the example illustrated in FIG. 3, 9-digit digital certificates are used with 0 and the high half of the codes reserved (e.g., for system or future use). The digital certificate code domain is thus from $N_{min}=1$ to $N_{max}=499,999,999$.

When a set of authentic items is produced and added to the ACA system for protection, each item is assigned a unique plain code to identify the authentic item in the ACA system. The plain code can be generated by the descriptor parameters of the authentic item, e.g., producer ID, product ID, item serial number, production time, etc. Alternatively, the plain code can be simply the next available code in the plain code domain. For example, if k bottles of famous wine are newly added to the ACA system for protection and the next available plain code is $N_{next}$, then the plain codes for those k items can simply be $N_{next}$ to $N_{next}+k-1$; and the new next available plain code is $N_{next}=N_{next}+k$.

The permuted codes are predefined by a permutation algorithm in the same code domain as the plain code. Each permuted code corresponds to one unique plain code and, in turn, one unique authentic item in the ACA system. The permutation algorithm is only known by the authentication server and is highly protected, for example, using a non-reproducible design where different executions of the same permutation algorithm generate different sets of permuted codes. The permuted code for an authentic item is used as the digital certificate that will be stored in its anti-counterfeit tag.

The anti-counterfeit certificate generators can be owned, controlled, and maintained by the anti-counterfeit authentication service provider that can be the product producer, a government agent, or a government/product producer authorized anti-counterfeit organization.

The anti-counterfeit certificate can be decrypted and decoded only by the authorized authentication server or another party with the decryption information.

Anti-Counterfeit Tag (ACT)

The anti-counterfeit tags (ACT) 132, in various embodiments, share common attributes. The ACT stores anti-counterfeit certificate information. The ACT corresponds to a unique authentic item (or a defined group of items). The ACT is made only by the anti-counterfeit service provider (or in some embodiments, the ACT is made by the producer of the authentic item). The ACT is attached to or associated with the corresponding authentic item. In some embodiments, the information stored in the ACT can be read only by authorized ACT readers; in other words, the information cannot be read by any non-authorized actors/devices. The ACT can have the same life span as the corresponding authentic item. For example, the ACT can be physically damaged and become invalid when opening the associated package. In another example, when buyers register the product after purchase and the associated anti-counterfeit certificate is then deregistered in the ACA system. The deregistered anti-counterfeit certificate will no longer pass the authentication test. Buyer participation can be encouraged, for example, with a lottery or a contest (e.g., the buyer removes part of the ACT to reveal a registration code for a prize).

The ACT can be designed using existing small-size storage devices. Examples include RFID tags, small-size universal serial bus (USB) storage devices, barcode (including multi-dimensional) tags, Bluetooth devices, near field communication (NFC) devices, etc.

ACTs may be application specific, i.e., vary with different to-be-protected products. Attachment of the ACT to its corresponding item may also be application-specific, e.g., depending on the item's physical dimensions and appearance. The item's physical dimensions and appearance may also directly impact the design and/or selection of the ACT itself. Considerations on ACT attachment may include, for various authentic items, impact on the item's appearance; invisibility to human eyes; inability to detached from the item without breaking the item or the package of the item; invalidation once the ACT is detached from the item or the location of the attachment on the item is changed; invalidation when a product quality guarantee period or a fixed service-set period expires, whichever comes first; considerations of product-specific attributes such as the product's physical dimensions and outside appearance; and other consideration of the product's producer.

ACT Reader

Functions of the anti-counterfeit tag reader 142 include reading the anti-counterfeit certificate from the ACT associated with an item to-be-authenticated and providing the anti-counterfeit certificate to the authentication client 140. The ACT reader 142 and the authentication client 140 can be implemented in the same device as different functions or in different devices.

The ACT reader is specific to a type or types ACTs, i.e., the ACT reader varies with different types of tags. Examples of the ACT readers include RFID readers, barcode scanners, USB hosts, NFC readers, smart phones or their accessories, personal computers, and laptops.

Authentication Client

The authentication client 140 is a functional module that originates anti-counterfeit authentication requests, communicates with the authentication server 122 over the communication network 148 for authentication services, and reports authentication results back to users of the anti-counterfeit authentication services. By way of introduction, example functions of an authentication client include: receiving anti-counterfeit certificates from the ACT reader; generating an anti-counterfeit authentication request, upon receiving a certificate; transmitting the anti-counterfeit request to the authentication server over the communication network; receiving the authentication results from the server over the communication network; and processing the authentication results, e.g., displaying the results to the user who requested the anti-counterfeit authentication service.

The functionality of an authentication client can be implemented in various devices that have data processing and data communication capabilities, e.g., smart phones, personal computers, laptops, tablets, etc. The authentication client can be implemented as a standalone device or as an add-on functional module on an existing device. If it is an add-on functional module, it can be a software-only module or a software and hardware module, depending on the particular existing device.

Anti-Counterfeit Application Protocol

Figure 4:
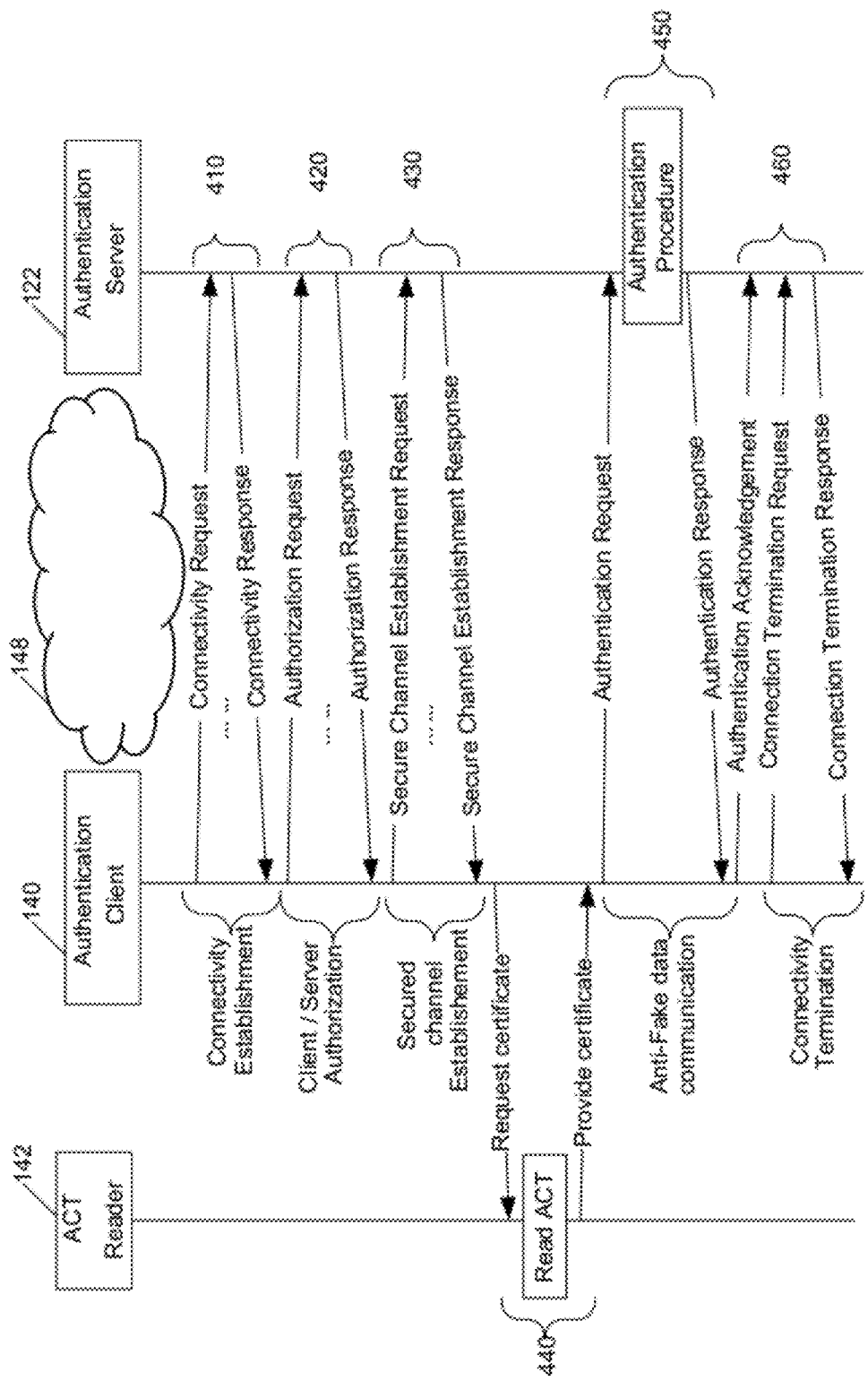
FIG. 4 is a flow diagram for an anti-counterfeit application protocol in accordance with aspects of the invention.

FIG. 4 is a flow diagram for an anti-counterfeit application protocol (ACAP). The ACAP describes communications in an anti-counterfeit authentication system, such as the ACA system of FIG. 1. From a data communication perspective, the communications between an authentication client 140 and an authentication server 122 will be at the application layer in the Open Systems Interconnection (OSI) reference model and use network interface services from the lower layers. The ACAP is a client/server based protocol.

ACAP execution is started at an authentication client by certain predefined triggers, e.g., click of an ACA application icon, push of a button on the authentication client device, or other event detection.

Phases of the ACAP illustrated in FIG. 4 include a connectivity establishment phase 410, a client/server authorization phase 420, a secured data channel establishment phase 430, a fetch anti-counterfeit certificate phase 440, an anti-counterfeit data communication 450, and a connectivity termination phase 460.

In the connectivity establishment phase 410, the authentication client establishes its connectivity to an authentication server. Connectivity means the authentication client and the authentication server can reach each other for data exchanges. Selection of a proper authentication server can be done at the authentication client. The selection may use preconfigured server information, may access name/server discovery servers in the network, or a combination. For example, the authentication server can be an identified with a built-in address or a cellular number.

The client/server authorization phase 420 occurs after connectivity is established in the connectivity establishment phase 410. The authentication client and the authentication server conduct authorization checking of each other to ensure that they both are authorized to communicate with the other for the anti-counterfeit authentication service. Authorization techniques that can be used for this are well known.

The secured data channel establishment phase 430 occurs after the authentication client and the authentication server successfully complete the client/server authorization phase 420. A secured data channel will be established before anti-counterfeit data are exchanged between the authentication client and the authentication server. Secured data channel means that security protections, e.g., encryptions, message authentication codes, will be applied to the data transmitted on the channel. During the secured data channel establishment phase, security information, e.g., the keys for encryption and/or message authentication codes will be communicated between the authentication client and the authentication server.

The fetch anti-counterfeit certificate phase 440 occurs after the secured data channel has been established between the authentication client and the authentication server in the secured data channel establishment phase 430. The authentication client fetches the anti-counterfeit certification through the ACT reader 142. Upon request by the authentication client, the ACT reader reads the contents from the ACT and provides the contents to the authentication client.

The anti-counterfeit data communication phase 450 occurs after the authentication client receives the anti-counterfeit certificate. Data are exchanged with the authentication server. First, the authentication client sends the authentication server an Authentication Request message with the anti-counterfeit certificate provided by the ACT reader. After receiving the Authentication Request message from the authentication client, the authentication server authenticates the provided anti-counterfeit certificate and then sends the authentication result to the client in an Authentication Response message. After receiving the Authentication Response message, the authentication client sends an acknowledgment message to the authentication server.

The connectivity termination phase 460 follows completion of the anti-counterfeit data communication. The authentication client sends the authentication server a Connection Termination Request message to terminate the data channel between the authentication client and the authentication server. Upon receiving the Connection Termination Request message from the authentication client, the authentication server sends a Response message to the authentication client. Resources reserved at both the authentication client and the authentication server can then be released.

The flow of transactions shown in FIG. 4 is intended to illustrate the structure of an example ACAP embodiment. Alterations, additions, and omissions may be made for other ACAP embodiments. For example, in an ACA system having a fixed-location authentication client with secured connectivity with the authentication server, the connectivity establishment phase 410, the client/server authorization phase 420, and the secured data channel establishment phase 430 can be skipped. For another example, some of the phases can be combined, for example, to reduce overhead in the handshaking processes. The connectivity establishment phase 410 and the client/server authorization phase 420 can be combined with requesting connectivity establishment and authorizing being in the same request message. For another example, the fetch anti-counterfeit certificate phase 450 can be executed first, with the "request certificate" signal omitted and the "provide certificate" signal becoming the trigger for the anti-counterfeit certification authentication procedure.

In addition to anti-counterfeit certificate authentication services, other applications can also be provided by the anti-counterfeit authentication system using the same client/server model, e.g., to register the authentic item's current owner.

In embodiments with rewriteable/reprogrammable ACTs, the ACAP described above can be amended to include ACT contents refreshing, for example, further protect the ACTs from duplication attacks. A process for refreshing ACT contents is described below.

Authentication Server

Figure 5:
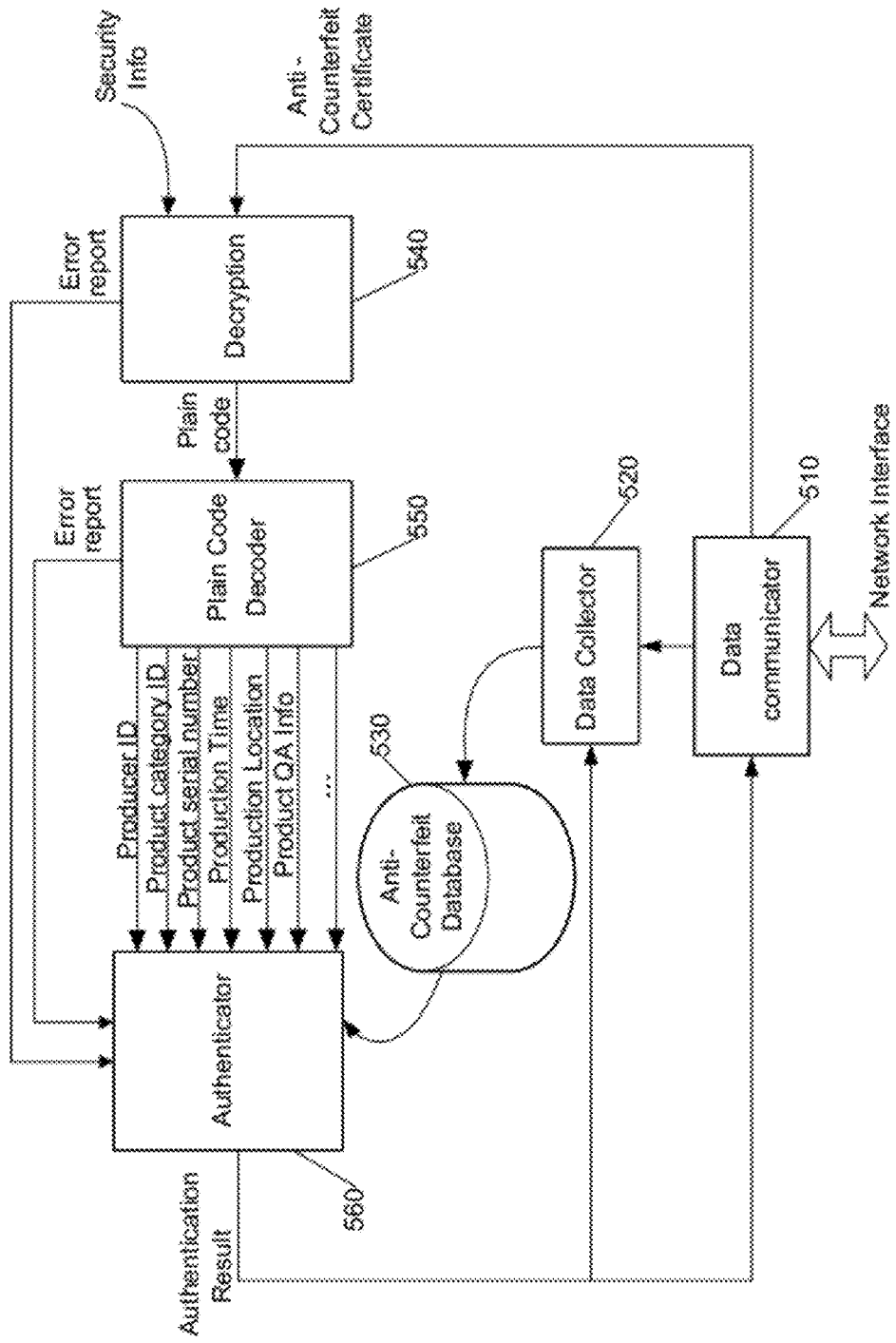
FIG. 5 is a functional block diagram of an authentication server in accordance with aspects of the invention.

FIG. 5 is a functional block diagram of an authentication server. The authentication server provides authentication services upon receiving authentication requests from the authentication clients. The authentication server includes six main functional modules: a data communicator module 510, a data collector module 520, a decryption module 540, a plain-code decoder module 550, an authenticator module 560, and an anti-counterfeit database 530. The authentication server of FIG. 5 may provide the authentication server 122 of the ACA system of FIG. 1.

The data communicator module 510 is responsible for data communications with other entities in the anti-counterfeit authentication system. For example, the data communicator module 510 communicates with the authentication client to receive authentication requests and also to transmit authentication results. The data communicator module 510 also communicates with authorized entities that generate the anti-counterfeit certificates and anti-counterfeit tags to collect information about newly issued certificates and tags. In addition, the data communicator module 510 may also communicate with entities that collect anti-counterfeit authentication statistical data.

The data collector module 520 is responsible for updating and maintaining the anti-counterfeit database 530. For example, the data collector module 520 receives newly issued anti-counterfeit certificate information from the data communicator module 510 and stores the received certificate information in the anti-counterfeit database 530. The data collector module 520 also receives authentication result reports from the authenticator module 560 and updates the database accordingly. In addition, the data collector module 520 can be triggered to perform anti-counterfeit database maintenance actions by the data communicator module 510 with received information from other authorized entities in the anti-counterfeit authenticator system, e.g., a notification of certificate expiration for a given item.

The anti-counterfeit database 530 stores information used by the authenticator module 560 to conduct authentication procedures, for example, the issued anti-counterfeit certificates and other information (e.g., status and security information) about the issued certificates.

The decryption module 540 decrypts anti-counterfeit certificates received from the data communicator module 510 into the plain codes using the security information such decryption keys. The decryption module 540 delivers the plain codes to the plain-code decoder module 550. If the decryption cannot be done successfully, the decryption module 540 reports the error to the authenticator module 560.

The plain-code decoder module 550 decodes plain codes received from the decryption module 540. The plain-code decoder module 550 reassembles the decoded information back into the descriptor parameters that were used in the encoding process, e.g., producer ID, product category ID, product serial number, etc. The plain-code decoder module 550 delivers the descriptor parameters to the authenticator module 560. If the decoding process cannot be done successfully, the plain-code decoder module reports the error to the authenticator module 560.

The authenticator module 560 performs the authentication procedure on the descriptor parameters received from the plain code decoder 550. The authenticator module 560 determines whether the descriptor parameters are for authentic items and produces the authentication results. The authenticator module 560 delivers the authentication results to the data communicator module 510 and the data collector module 520. The authenticator module 560 can also determine the authentication results based receiving error reports from the decryption module 540 or the plain-code decoder module 550.

The authentication procedures can be application-specific. The function of an authentication algorithm can include a series of comparing actions between the descriptor parameter values provided by the plain code decoder module 550 and the corresponding data stored in the anti-counterfeit database 530. Example criteria used in authentication include: whether the details derived from the certificate sent from authentication client match with the records in anti-counterfeit database 530; and when hash codes are used in the certificate generation, whether the hash code derived from the certificate provided by the authentication client exist in the anti-counterfeit database 530.

In an embodiment, the authentication server returns the authentication result to the authentication client with additional information describing the item (e.g., an image or text). The user can verify that the ACT corresponds with the item they are buying based on the additional information. The item description may include information customers are generally interested in and also normally can be verified by looking at the item, e.g., product name, producer name, production time, expiration time, etc. For security purposes, not all the information in the database about the item needs to be provided to the authentication client in the authentication response message. Also, the additional information in the authentication response message can be encrypted. After authentication, the authentication client decrypts the message from the authentication server and displays the results to the user.

In an embodiment, the authentication servers can be owned and maintained only by providers of the anti-counterfeit authentication service. The providers can include the producers of the authentic products, governmental agents, or governmental/producer authorized organizations.

In and ACA system using CPDC, when the authentication server receives an authentication request, the authentication server will obtain the digital certificate from the authentication request and map the digital certificate to a corresponding access code through a mapping algorithm. (FIG. 3) The access code is used to locate the information record for the digital certificate in the authentication database 530. If the mapping algorithm cannot find a corresponding access code for the digital certificate, an authentication "failure" will be returned to the authentication requester. Also, if the information record in the authentication database for the access code is empty or invalid, an authentication "failure" will be returned to the authentication requester. Otherwise, further authentication actions can be taken based on the contents of the information record.

In addition to providing an authentication response to the authentication client, the authentication server can also provide the authentication result and related information (e.g., the requester's location) to certain authorized entities (e.g., the item producers, government agents, etc.) for anti-counterfeit alarms, statistical studies, consumer reports, etc. Alternatively, the authentication sever can store the information and generate reports and analyses itself.

The authentication server and authentication client can also provide other anti-counterfeit services, e.g., registering owner information of authentic items.

Copying-Attack Probability

Additionally, the authentication sever can use a data analysis scheme to derive a copying-attack probability as part of the authentication process. In overview, the analysis includes collecting the data of authentication requests for each ACA-protected item, e.g., the time of the request being sent, location from which the request was sent, identification information about the requester (e.g., cell number or IP addresses).

The collected data is analyzed to derive the probability of a copying attack. For example, when the authentic item is a bottle of famous wine and there are thousands of authentication requests in one day, the probability of a copying-attack is high. In another example, when there are multiple almost-simultaneous authentication requests sent from distant locations (e.g., separated by thousands of kilometers), the probability of a copying-attack is also high.

An example algorithm for use in deriving the copying-attack probability includes: selecting the parameters that are used as the inputs for the derivation; defining thresholds for the selected parameters based on the attributes of the protected item, historical statistical knowledge, relevant regulations/policies, etc.; dynamically adjusting the thresholds using knowledge gained as authentication requests are processed; defining triggers to invoke a copying-attack probability derivation function, e.g., event-driven, time-driven, etc.; recording previous derivation results and the recorded results as an input for a next execution of the derivation function; and generating copying-attack alarms or warnings and sending the alarms or warnings to relevant parties, e.g., authentication requesters, producers, consumer protection organizations, government offices, etc.

The above Copying-Attack Probability analysis can be effectively used with low-cost non-rewritable anti-counterfeit tags, such as barcodes and magnetic cards/chips. It can also be used in conjunction with the ACT Contents Refreshing (ACR) Scheme with the rewritable anti-counterfeit tags, e.g., USB, RFID, etc.

Security Considerations

The security mechanisms enhance the anti-counterfeit authentication system. By way of introduction, security mechanisms include: using encryption to generate the anti-counterfeit certificates; mutually authorizing the authentication server and authentication client before any anti-counterfeit authentication messages can be exchanged between them; using a secured data channel between authentication client and authentication server, including data payload encryption and message authentication code; decrypting and decoding anti-counterfeit certificates only at the authentication server, not at the authentication client or any other entity; protecting against ACT duplication attacks; protecting against forged authentication client attack; and protecting against forged authentication server attack.

Protection from ACT Duplication Attack

ACT duplication attack involves attempting to use duplicated anti-counterfeit tags to authenticate counterfeit items. Once an authentic item with its ACT leaves the producer, it may be obtained by those who want to produce counterfeit items. They may duplicate the ACT and use the duplicated ACTs for counterfeit items. The anti-counterfeit authentication system is protected from ACT duplication attacks.

Protection from ACT duplication attacks may come from each ACT having a unique identifier. For example, tag component suppliers can provide RFID tags, secure USB devices, NFC tags, and other electronic items used to make the ACTs so that each ACT has a built-in unique identifier. Uniqueness of the ACT identifiers can be used to check the uniqueness of the ACT and also used to protect the contents stored in it, e.g., by using the identifier in generating the anti-counterfeit certificate for the authentic item.

Protection from ACT duplication attacks may also come from the ACT's identifier being unreadable by an unauthorized entity, e.g., a device, a program, or a person. Protection from ACT duplication attacks may also come from the ACT's identifier not being copyable to a counterfeit tag. Protection from ACT duplication attacks may further come from the ACT contents being refreshed and synchronized with the authentication server based on certain trigger conditions, so that the authentic ACT will be kept valid and duplicated ACTs will be made invalid due to lack of synchronization with the authentication server. An ACT contents refreshing process is described below.

ACT Contents Refreshing (ACR) Process

An ACT contents refreshing (ACR) process and its use to protect from ACT duplication attacks can be understood by considering an example embodiment. The ACR process works with ACTs that are not only readable but also writeable or reprogrammable (e.g., secure USB devices, writable RFID tags, etc.) by authorized modules even after the ACTs and their associated authentic items leave their producers.

The contents of an ACT may include the anti-counterfeit certificate of an authentic item and other information that the ACA service provider decides to store in the ACT. With the ACR process, the contents in the ACT are defined in multiple versions, e.g., named as $C_1, C_2, \ldots, C_n$, where n is an integer and is sufficiently large for the purpose of protecting the system from ACT duplication attack. The ACT contents versions can be generated by certain carefully designed algorithms, e.g., by varying certain parameters in the anti-counterfeit certificate generator, by selecting different ways to store contents in the ACT, or by attaching a timestamp.

An example ACR process uses a secure small-size USB storage as the ACT. The example ACT has 256 bytes storage capacity, and the ACT contents are n bytes in size, where $n<=256$. One parameter regarding how to store the n bytes in the ACT is the starting address. Assume the first byte in the USB storage is addressed by 0x00 and the last byte in the USB storage is addressed by 0xFF. The different versions of ACT contents could be the same data but stored with different starting address using wrap-around addressing, i.e., the highest-addressed byte is followed by the lowest-addressed byte.

Another example of different ways to store the ACT contents is to have different byte orders. For example, for a 128-byte ACT contents, the odd bytes can be stored first followed by the even bytes.

The following sequence illustrates an example embodiment of the ACR process.

(A) An ACT is initialized with contents, version $C_1$, at the time that the ACT is associated with an authentic item by the item producer or by the ACA service provider.

(B) The authentication server keeps track of the current version of the ACT, i.e., $C_1$, at initialization of the authentic item's record in the authentication database.

(C) An authentication client functional module is triggered by a user. The authentication client establishes connectivity with the selected authentication server and checks security with the authentication server to mutually authorize each other.

(D) Only after the security checking between the authentication client and the authentication server, the authentication client triggers the ACT reader to read the ACT, i.e., read $C_1$.

(E) The authentication client conducts authentication checking with the authentication server using $C_1$.

(F) If the authentication checking passes, i.e., $C_1$ matches the current version in the authentication server's database record and all other checks are successful, a new version of the ACT contents, $C_2$, will be delivered to the authentication client along with the authentication results as well as any additional information the server may provide to the authentication client. Alternatively, the new version of the ACT contents, $C_2$, can be generated by the authentication client based on a predefined algorithm that guarantees the same version generated at both server and client.

(G) After a successful anti-counterfeit authentication checking and receiving or generating the new version of ACT contents, the authentication client will trigger the ACT writer (which ca be part of the ACT reader) to store the new version of the ACT contents, $C_2$, in the ACT. The server will also update its current version of the ACT record to reflect the new version, $C_2$.

When the ACR process is completed, the ACT contents have been refreshed with a new version that is also synchronized with the authentication server. In the above ACR process, the authentication client establishes connectivity with the authentication server before the authentication client triggers the ACT reader to read the contents of the ACT. In this way, synchronization of the ACT contents between the authentic ACT and its record in the authentication server database can be maintained.

Security mechanisms in the ACR process include: ACT content refreshing, ACT and authentication server database record synchronization, and ACT access only by an authorized authentication client. These mechanisms work together to effectively protect the system from ACT duplication attack. For example, a person can buy an authentic item and use an authorized authentication client to get the current contents of the item's ACT, say $C_i$ and then duplicate a thousand ACTs with the same contents $C_i$ and the same ACT identifier. However, after the authorized authentication client completes the ACR process, the ACT of the authentic item will be refreshed to $C_{i+1}$ and its record in the authentication server database will also be updated to $C_{i+1}$. Thus, the contents version, $C_i$, in the duplicated ACTs is obsolete. The duplicated ACTs will fail authentication, and only the authentic item has a valid ACT.

Similarly, if the new version of the ACT contents, $C_{i+1}$, is used to produce thousands of duplicated ACTs, only the first ACT that requests the authentication service will be authenticated. After the first one is authenticated, its ACT contents will be refreshed to a next version, $C_{i+2}$, and the record in authentication server database will also be updated to the next version, $C_{i+2}$, thus resulting in all the other duplicated ACTs becoming invalid. This defeats the purpose of the ACT duplication attack, because only one ACT can get authenticated.

In addition, the authentication client can be implemented by using anti-reverse-engineering techniques to further increase the protection of the ACT contents from hacking. Additional description of authentication client security is provided below.

Synchronized Secure Timestamp Process

A Synchronized Secure Timestamp process provides an alternative or additional method of protection from ACT duplication attack. "Secure timestamp" refers to the use of timestamp values provided by a secure real-time clock that can be read only by authorized entities and cannot be modified by any external sources.

The Synchronized Secure Timestamp process keeps a timestamp of the last-update time for each authentic item under the protection of the authentication system. The timestamp is kept at both the authentication sever and the ACT. The timestamps at the authentication server and the anti-counterfeit tag are synchronized; any update to the anti-counterfeit tag must be under the control of the authentication server. At initialization of the anti-counterfeit tag, the anti-counterfeit tag secure timestamp records the time at which the anti-counterfeit certificate is written into the anti-counterfeit tag, and the same timestamp value is recorded in the authentication server. If an ACR process is used, each time the anti-counterfeit tag contents are updated, the timestamp values are also updated at both anti-counterfeit tag and the authentication server.

The timestamp value stored at the anti-counterfeit tag is provided by a secure real-time clock to record the true time at which the anti-counterfeit tag content is updated. The timestamp at the anti-counterfeit tag can be read by an authorized entity, but it cannot be modified by any external sources.

When an authorized authentication client reads the anti-counterfeit tag contents, it also reads the secure timestamp from anti-counterfeit tag and includes the value of the timestamp in the authentication request sent to the authentication server. When the authentication server receives the authentication request with the last-update timestamp, it checks that the provided timestamp value with its own recorded timestamp value. If the timestamp values match, the authentication server continues the authentication process; otherwise, the authentication server returns a failure result.

The above Synchronized Secure Timestamp process can effectively protect the authentic products from anti-counterfeit tag content copying attack through the secure timestamp features.

Protection from Forged Client Attack

Forged client attack refers to an unauthorized program, functional module, or other entity impersonating the authentication client to communicate with the authentication server or other parts of the anti-counterfeit authentication system.

A mechanism of protecting the anti-counterfeit authentication system from forged client attack is a mutual authorization handshaking between the authentication client and the authentication server, for example, as described with reference to FIG. 4.

Figure 6:
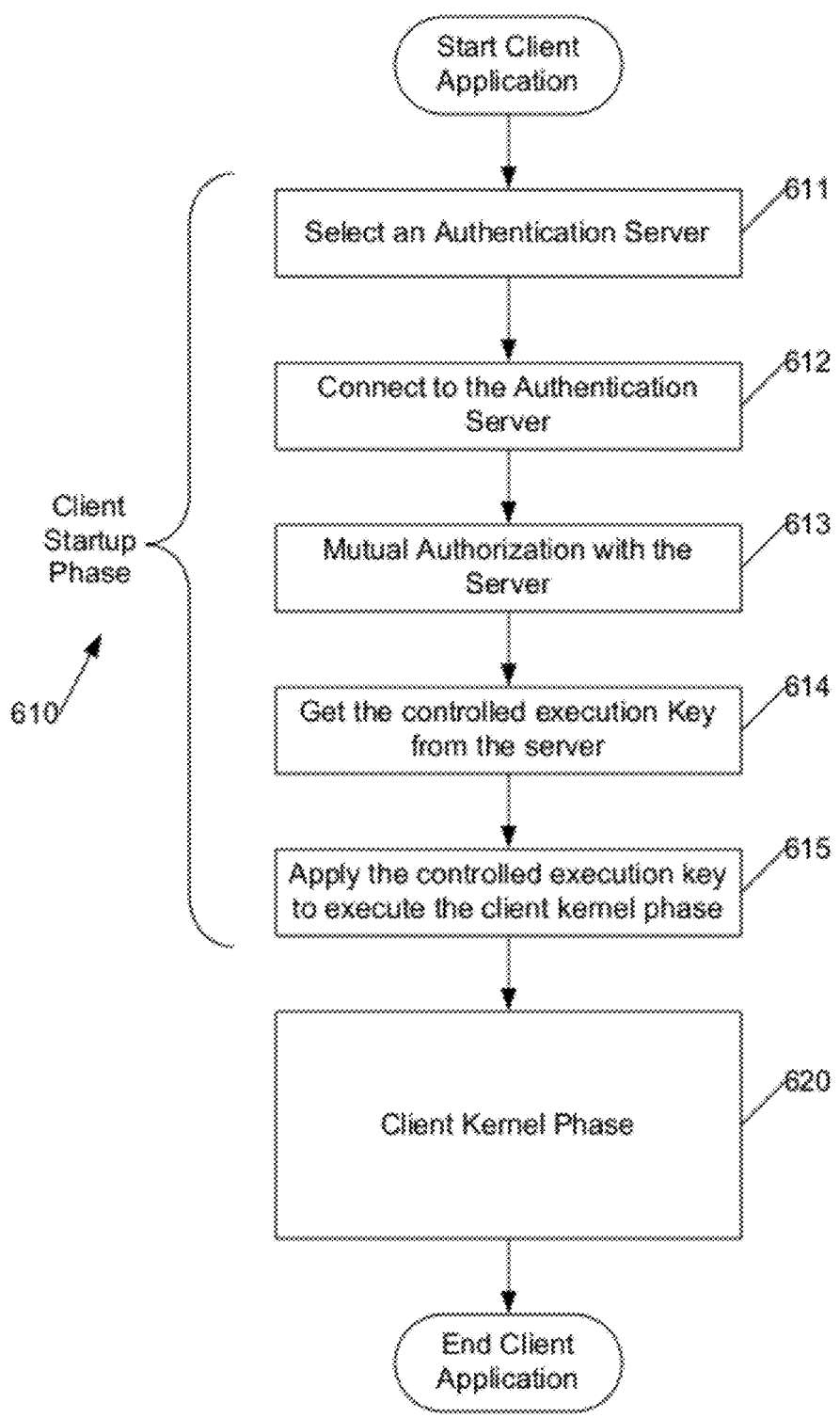
FIG. 6 is a flowchart of a controlled client execution process in accordance with aspects of the invention.

Another mechanism of protecting the anti-counterfeit authentication system from forged client attack includes controlling execution of the authentication client software code (called controlled client execution). FIG. 6 is a flowchart of a controlled client execution process. The process includes a startup phase 610 and a kernel phase 620.

When the authentication client starts, it executes the startup phase 610. In block 611 of the startup phase 610, the authentication client selects the authentication server to work with. In block 612; the authentication client establishes connectivity with the selected authentication server. In block 613, the authentication client conducts a mutual authorization with the authentication server. In block 614, the authentication client requests an execution key from the authentication server. The execution key controls execution of the client kernel phase. In block 615, the process applies the execution key from the authentication server to execute the client kernel phase 620. In this way, the client kernel phase 620 is protected from a forged client attack. The client kernel phase 620 can be executed only when the proper execution key is provided. In an embodiment, the execution key can control how the client kernel phase is executed, for example, there can multiple conditional branches in the client kernel phase with the execution key being used to select the right branches for a specific client.

Protection from Forged Sever Attack

Forged server attack refers to an unauthorized program, functional module, or other entity impersonating the authentication server to communicate with the authentication client or other parts of the anti-counterfeit authentication system.

In an embodiment, the authentication server is owned, controlled, managed, and maintained by ACA service providers, such as governmental agents, authentic product producers, and entities authorized or governments or product producers. The ACA service providers are highly motivated to protect the authentication servers by adopting secured mechanisms in the relevant modules and components to protect the ACA system from forged server attack.

A mechanism for protecting against a forged server attack uses authentication server discovery and selection. When an authentication client initializes the connectivity establishment with an authentication server, it first needs to discover the available authentication servers and select a proper one to connect to. This authentication server discovery and selection procedure is designed so that only an authorized authentication server will be selected. For example, the authorized authentication server information is embedded in the authentication client and/or provided by a trusted source, and the authentication client discovers and selects the authentication server only based on the trusted information.

Another mechanism for protecting against a forged server attack addresses authentication server and authentication client mutual authorization. As discussed above, before an authentication client and an authentication server exchange any authentication data, they to conduct a mutual authorization to each other. The mutual authorization procedure provides protection for the ACA system from forged-server attacks and also from forged-client attacks.

Another mechanism for protecting against a forged server attack addresses authentication server implementation with anti-reverse-engineering mechanisms. This means that the ACA implementation cannot be reproduced by monitoring, testing, and sniffing the authentication server's external behavior and external interactions with other modules in the ACA system.

Another mechanism for protecting against a forged server attack addresses inter-server communication and cross-checking: For an ACA system with multiple authentication servers in service, the multiple authentication servers are connected through communication networks, e.g., internet, and they are communicated with each other to coordinate and synchronize.

Another mechanism for protecting against a forged server attack addresses timely system exception detecting and reporting. Detection mechanisms can exist in all relevant components and modules. If any suspicious authentication server behavior is detected, timely reporting to the ACA service provider is accomplished.

Authentication Service Provisioning

Anti-counterfeit authentication services can be provided using various service provisioning models with a wide range of system organizations and participants. In a first service provision mode, the anti-counterfeit authentication service is headed by the product producer. With this anti-counterfeit service provisioning model, the product producer acts as the owner and provider of the anti-counterfeit system and services. The product producer owns, provides, and maintains the anti-counterfeit certificate generation, anti-counterfeit tag generation and attachment, and the authentication server. The product producer can work with data communication service providers to enable the data communications required in the anti-counterfeit service system, e.g., having agreements regarding usages and fees for the anti-counterfeit data traffic over the data communication networks. The product producer can work with device vendors to make devices with ACT reader function and authentication client functions or to introduce the functions modules in existing devices to enable ACT reader and authentication client applications.

In a second service provision mode, the anti-counterfeit authentication service is headed by a government agent or authorized entity (e.g., a customer protection association). With this anti-counterfeit service provisioning model, a government agent or an authorized entity acts as the owner and provider of the anti-counterfeit system and services. The partition of major responsibilities can include: the anti-counterfeit service provider owns, provides, and maintains the anti-counterfeit certificate generator and the authentication server;

the anti-counterfeit service provider works with the product producers for anti-counterfeit certificate generation and anti-counterfeit tag attachment for each type of product; the anti-counterfeit service provider works with the data communication service providers to enable the data communications required in the anti-counterfeit authentication system; and the anti-counterfeit service provider works with device vendors to enable ACT reader and authentication client functions in selected devices.

A special example of the second service provision mode is where the authorized entity is also the data communication service provider. In this case, the anti-counterfeit authentication service will become one of the applications provided by devices and networks of the data communication service provider.

The first service provision mode can be a quick and simple solution to protect the products of the producer. The producer has a full control and responsibility for the anti-counterfeit service for its products.

The second service provision mode can be a general solution to protect a wide range of products from multiple procedures.

An example of the second service provision mode includes a central entity, an anti-counterfeit center (ACC), to run and maintain the anti-counterfeit server, database, and take responsibility for issuing certificates, authenticating producers, providing factory-side devices, releasing client software, and upgrading each component in the ACA system. The factory-side devices are used to write data into ACTs. In an embodiment, only a few parameters are used to ensure that ACT writes only occur for authorized products.

The ACC allows a producer to join the ACA system and to be provided ACA devices. The devices can be supplied by the ACC or by device makers authorized by the ACC. In an embodiment, the ACC issues a certain number of anti-counterfeit certifications and anti-counterfeit tags to a producer per production cycle. The producer operates the ACA devices, writes the anti-counterfeit tags, attaches them to authentic products, and reports the used anti-counterfeit tags and anti-counterfeit certifications to the ACC. The ACC then sets the corresponding records to be searchable/verifiable.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A communication network based anti-counterfeit authentication system, comprising:
  a code permutation digital certificate generator for forming an anti-counterfeit certificate;
  an anti-counterfeit tag storing the anti-counterfeit certificate, the anti-counterfeit certificate having an encrypted code corresponding to an authentic item;
  an authentication server configured to receive an authentication request through a communication network, conduct authentication of the authentication request, and provide an indication of the conducted authentication; and
  an authentication client configured to originate the authentication request, the authentication request including at least some of the contents of the anti-counterfeit tag, the authentication client further configured to transmit the authentication request through the communication network to the authentication server, receive the indication of the conducted authentication from the authentication server through the communication network, and supply the indication of the conducted authentication to a user of the anti-counterfeit authentication system.

2. The anti-counterfeit authentication system of claim 1, further comprising an anti-counterfeit tag reader configured to read the contents of the anti-counterfeit tag and supply the read contents to the authentication client.

3. The anti-counterfeit authentication system of claim 2, further comprising an anti-counterfeit tag writer configured to write updated contents to the anti-counterfeit tag.

4. The anti-counterfeit authentication system of claim 1, further comprising an anti-counterfeit certificate generator configured to generate the anti-counterfeit certificate based on values of descriptive parameters of the authentic item.

5. The anti-counterfeit authentication system of claim 1, wherein the authentication server comprises:
   a data communicator module configured to receive the authentication request and transmit the indication of the conducted authentication;
   a decryption module configured to decrypt the received anti-counterfeit certificate to produce plain codes;
   a plain-code decoder module configured to decode the plain codes to assemble descriptor parameters;
   an authenticator module configured to authenticate the authentication request using the descriptor parameters;
   an anti-counterfeit database configured to store information used by the authenticator module; and
   a data collector module configured to maintain the anti-counterfeit database.

6. The anti-counterfeit authentication system of claim 1, wherein the anti-counterfeit tag is selected from the group consisting of one-dimension barcodes, multidimensional barcodes, universal serial bus storage devices, radio-frequency identification tags, Bluetooth devices, and near field communication devices.

7. A method for operating an authentication server in an anti-counterfeit authentication system, the method comprising:
   receiving an authentication request from an authentication client through a communication network, the authentication request including at least some of the contents of an anti-counterfeit tag, the anti-counterfeit tag storing an anti-counterfeit certificate associated with an authentic item, the anti-counterfeit certificate formed using a code permutation digital certificate generator;
   determining authenticity for the authentication request; and
   communicating the authenticity determination to the authentication client through the communication network.

8. The method of claim 7, wherein the anti-counterfeit certificate includes an encrypted version of a plain code formed from values of descriptor parameters for the authentic item.

9. The method of claim 8, wherein the descriptor parameters for the authentic item are selected from the group consisting of product identifiers, category codes, serial numbers, production dates and times, production locations, and quality assurance information.

10. The method of claim 8, further comprising communicating information about the values of descriptor parameters to the authentication client.

11. The method of claim 7, further comprising deriving a copying-attack probability based on analysis of authentication requests for the authentic item, and wherein determining authenticity for the authentication request includes the derived copying-attack probability.

12. The method of claim 7, wherein the authentication request includes a timestamp value read from the anti-counterfeit tag; and wherein determining authenticity for the authentication request includes comparing the timestamp value in the authentication request to an associated timestamp value stored at the authentication server.

13. The method of claim 12, further comprising receiving an updated timestamp value for use in a subsequent authentication request, the updated timestamp value being stored in the anti-counterfeit tag.

14. The method of claim 7, wherein the contents of the anti-counterfeit tag are updated when the authenticity determination is successful.

15. The method of claim 7, wherein the contents of the anti-counterfeit tag further include a unique identifier of the anti-counterfeit tag, the authentication request includes the unique identifier, and determining authenticity for the authentication request uses the unique identifier.

16. The method of claim 7, wherein the authentication server comprises:
   a data communicator module configured to receive the authentication request and communicate the authenticity determination;
   a decryption module configured to produce plain codes by decrypting information in the anti-counterfeit certificate received in the authentication request;
   a plain-code decoder module configured to assemble descriptor parameters by decoding the plain codes;
   an authenticator module configured to determining the authenticity using the descriptor parameters; and
   an anti-counterfeit database configured to store information used by the authenticator module.

17. The method of claim 16, wherein receiving the anti-counterfeit certificate read from the anti-counterfeit tag occurs only after successfully mutually authenticating the authentication client and the authentication server.

18. The method of claim 16, further comprising identifying the authentication server before establishing connectivity between the authentication client and the identified authentication server.

19. The method of claim 16, further comprising presenting an indication of the authenticity determination to a user.

20. A method for operating an authentication client in an anti-counterfeit authentication system, the method comprising:
   establishing connectivity between the authentication client and an authentication server;
   mutually authenticating the authentication client and the authentication server;
   establishing a secured channel between the authentication client and the authentication server;
   receiving an anti-counterfeit certificate read from an anti-counterfeit tag, the anti-counterfeit certificate formed using a code permutation digital certificate generator;
   sending an authentication request to the authentication server, the authentication request including at least some of the of the anti-counterfeit certificate;
   receiving an authenticity determination from the authentication server, the authenticity being determined using contents of the authentication request; and
   terminating the connectivity between the authentication client and the authentication server.

* * * * *